(12) United States Patent
Takahashi

(10) Patent No.: US 6,589,120 B1
(45) Date of Patent: Jul. 8, 2003

(54) GAME APPARATUS

(75) Inventor: Toru Takahashi, Tokyo (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/693,371

(22) Filed: Oct. 19, 2000

(30) Foreign Application Priority Data

Oct. 20, 1999 (JP) .......................................... 11-298461

(51) Int. Cl.⁷ .............................. A63F 9/02; A63F 13/00
(52) U.S. Cl. ............................................ 463/51; 463/1
(58) Field of Search .............................. 463/1, 2, 5, 23, 463/30, 31–32, 43, 47.2–47.6, 49–57, 38, 37; 345/952; 273/127 R, 461, 108.1, 237, 108

(56) References Cited

U.S. PATENT DOCUMENTS

| 5,366,229 A | * | 11/1994 | Suzuki ........................ 273/310 |
| 5,382,026 A | * | 1/1995 | Harvard et al. ............. 273/310 |
| 5,569,085 A | * | 10/1996 | Igarashi et al. ................ 463/49 |
| 5,795,224 A | * | 8/1998 | Yoshida ......................... 463/2 |
| 5,853,324 A | * | 12/1998 | Kami et al. ..................... 463/2 |
| 6,102,801 A | * | 8/2000 | Sugawara ..................... 463/31 |
| 6,206,783 B1 | * | 3/2001 | Yamamoto et al. ........... 463/36 |
| 6,220,965 B1 | * | 4/2001 | Hanna et al. .................. 463/52 |

FOREIGN PATENT DOCUMENTS

| JP | 05-322487 | 7/1993 |
| JP | 07-181934 | 7/1995 |
| JP | 09-075552 | 3/1997 |
| JP | 10-230081 | 9/1998 |
| JP | 2000-153060 | 6/2000 |

* cited by examiner

Primary Examiner—Kim Nguyen
(74) Attorney, Agent, or Firm—Dellett and Walters

(57) ABSTRACT

A game apparatus, a method of preparing a game image and information storage medium are disclosed wherein, in the case of a player character moving in a three-dimensional game space, a plurality of viewpoint positions including the player characters in a view range are set, and wherein a plurality of two-dimensional images with different details are produced corresponding to each viewpoint position.

10 Claims, 17 Drawing Sheets

GAME APPARATUS

BACKGROUND OF THE INVENTION

The present invention relates to a game apparatus wherein an object displayed on a screen performs a prescribed movement.

Game apparatus are known conventionally wherein a player shoots a target character or the like displayed on a screen of a display device using a shooting device such as a gun. For example, in the game apparatus disclosed in Japanese Patent Application Laid-Open No. 9-75552 specification, a virtual bullet is fired from a muzzle by pulling a trigger provided on a gun-type controller and an impact position on the screen is calculated. When the impact position matches with the target character, namely, when the bullet hits the target, the game performance is carried out such that the character is wounded or destroyed. In a game apparatus disclosed in Japanese Patent Application Laid-Open No. 10-230081 specification, the impact position is calculated when the trigger of the gun-type controller is pulled. Then a determination is made whether the bullet hits the character or not, and if there is no hit, a determination is made whether a vicinity of the character is shot, so that different game performances are carried out depending upon the impact position.

In the above described conventional game apparatus, the impact position is not calculated until the trigger of the gun-type controller is pulled by the player, and the predetermined game performance is carried out when the bullet hits directly the character or its vicinity. Accordingly, there is a problem that no action is taken when the player moves the aiming position of the gun-type controller to match with the enemy character or the like on the screen, which lacks reality. For example, in a scene of shooting at each other, it is unnatural that the enemy character on which a gun is pointed is not scared, does not escape nor hide behind an obstacle. Further, in a scene of a fight by steering a fighter plane or the like, when an aiming position of a missile or the like is locked, it is unnatural that the enemy character does not avoid this.

SUMMARY OF THE INVENTION

The present invention is made in view of the above and it is an object of this invention to provide a game apparatus which enhances reality of a game.

To solve the above described problems, in a game apparatus according to the present invention, when a player operates position specifying unit to specify an arbitrary position on a screen, character movement setting unit makes a character to perform a prescribed movement in the case where a display position of the character included in a game image displayed on the screen approaches the specified arbitrary position. According to the present invention, when the character and its surroundings displayed on the screen are pointed by the player, the character may be made to perform the prescribed movement such as escaping. Accordingly, an avoiding movement or the like of the character aimed by the fighting opponent can be reproduced with reality, thereby permitting enhancing the reality of the game.

Preferably, the above described position specifying unit includes a gun-type controller, and an arbitrary position on the screen specified by the position specifying unit is an aiming position of the gun-type controller. The game performance can be carried out such that, when the muzzle of the gun-type controller is pointed on the character, the character recognizes being aimed at and performs a prescribed movement, which enhances the reality of the game.

When the above described gun type-controller comprises a light emitting section for emitting light toward the aiming position, it is preferable to provide a screen arranged so as to cover the display unit and formed from a translucent material, to photograph an irradiation position of the light on the screen, and to calculate the aiming position of the gun-type controller by aiming position calculating unit, based on the irradiation position photographed by the camera. The aiming position is detected by photographing the irradiation position of the light from the gun-controller so that the aiming position can be specified independent of the operation of a trigger or the like.

It is also preferable to emit the light with infrared wavelengths from the above described light emitting section. Detecting the aiming position using the infrared light eliminates an effect of a visible ray irradiated from the character or the like displayed on the screen, which permits precisely specifying the aiming position of the gun-type controller in a condition where the game image is displayed.

Alternatively, it is preferable that the above described position specifying unit comprises a dedicated controller provided with a movement operating section such as a cross cursor key or a joystick and that the arbitrary position on the screen specified by the position specifying unit is the display position of an indication moving on said screen depending upon an operation of said movement operating section. It is possible to point the character by operating the movement operating section such as the cross cursor key provided on the dedicated controller to move the prescribed indication displayed on the screen. The game performance can be carried out such that the character recognizes being pointed as described above and perform the prescribed movement, which enhances the reality of the game.

It is preferable that the above described character movement setting unit makes the character to perform the prescribed movement when the display position of the character is included in a first area including the arbitrary position specified by the position specifying unit. Checking whether the display position of the character is included or not in first area corresponding to the specified arbitrary position and its surroundings can be carried out simply by comparing coordinates thereof, which permits processing to be simple.

It is also preferable that the above described character movement setting unit makes the character to perform the prescribed movement when the arbitrary position specified by the position specifying unit is included in a second area including the display position of the character. Like the case using the above described first area, checking whether the pointed arbitrary position is included or not in the second area corresponding to the character and its surroundings can be carried out simply by comparing coordinates thereof, which permits processing to be simple.

It is further preferable to predict time which it takes the arbitrary position to arrive at a third area including the display position of the character based on a moving speed and a moving direction of the specified arbitrary position by an arrival time prediction unit and make the character to perform the prescribed movement when the prediction is within a prescribed time. In a fighting game, it is natural that the player decides his own movement watching the movement of a fighting opponent, so that predicting the time which it takes the arbitrary position specified by the player to arrive at near the display position of the character to set the movement which the character is made to perform, which further enhances the reality of the game.

It is preferable that the above described character movement setting unit variably set the prescribed movement to be performed afterwards depending upon the movement of the character before the prescribed movement. It is further preferable that the character movement setting unit variably set the prescribed movement which the character is made to perform based on the result of calculation of a distance between the arbitrary position specified and the display position of the character by the distance calculating unit.

It is also preferable that character movement setting unit variably set the prescribed movement which the character is made to perform based on the result of a calculation of a moving speed of the arbitrary position by a speed calculating unit. In this way, the prescribed movement of the character is not decided uniformly but variably set depending upon a preceding movement of the character, a distance to the specified arbitrary position, or the moving speed of specified arbitrary position, which further enhances the reality of the game.

DESCRIPTION OF THE PREFERRED EMBODIMENT

An embodiment of a game apparatus according to the present invention will be described with reference to the drawings.

Figure 1:
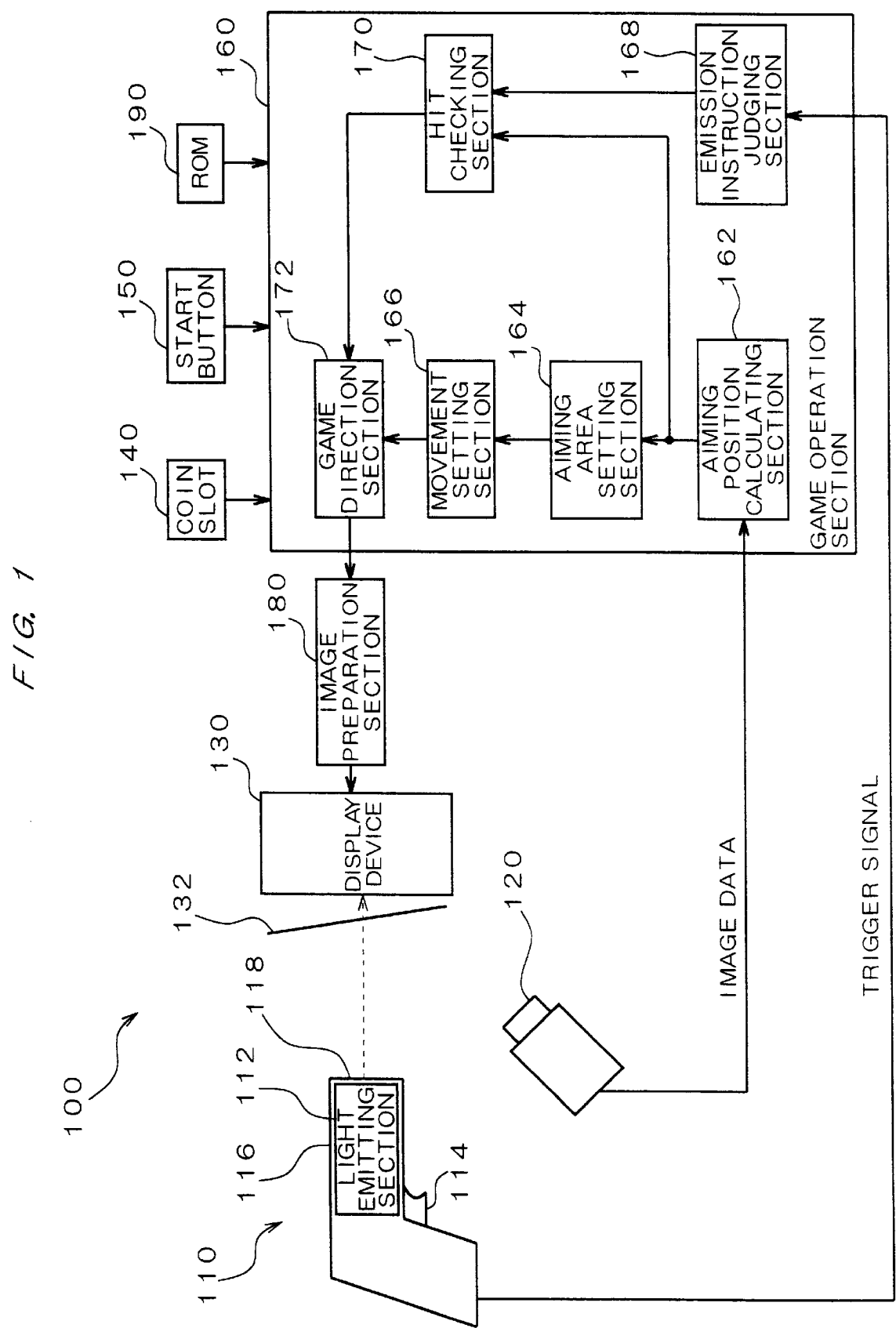
FIG. 1 is a view showing a configuration of a game apparatus according to a first embodiment of the present invention.
Figure 2:
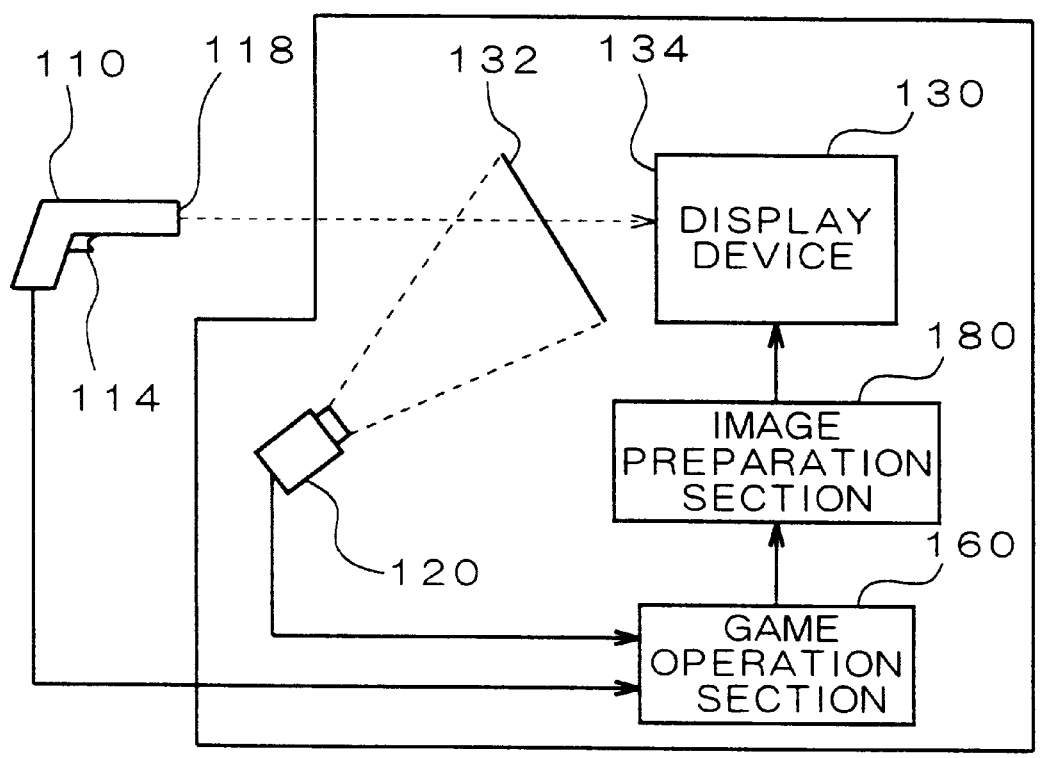
FIG. 2 is a view schematically showing a positional relationship of a configuration of part of the game apparatus shown in FIG. 1.

FIG. 1 is a view showing a configuration of the game apparatus according to the present embodiment. FIG. 2 is a view schematically showing a positional relationship of a configuration of part of the game apparatus. The game apparatus 100 shown in the drawings comprises a gun-type controller 110, a camera 120, a display device 130, a coin slot 140, a start button 150, a game operation section 160, an image preparation section 180 and a ROM 190.

The gun-type controller 110 includes a light emitting section 112 and a trigger 114. The light emitting section 112 emits light with infrared wavelengths and includes, for example, semiconductor laser. The laser emitted from the light emitting section 112 is emitted from a muzzle 118 in a direction parallel to a gun body 116 of the gun-type controller 110.

The trigger 114 is used when a player gives instructions to fire a virtual bullet. When the player pulls the trigger 114, a trigger signal is output from the gun-type controller 110 toward the game operation section 160. The player sets the muzzle 118 of the gun-type controller 110 on an enemy character or the like displayed on a display 134 of the display device 130 to settle the aiming position and then pull the trigger 114, so that a virtual bullet is fired from the gun-type controller 110 at the enemy character or the like displayed on the aiming position on the display 134.

The camera 120 is used for taking photographs of a screen 132. The screen 132 is formed with a translucent material and arranged in front of the display device 130 and at a position such that a view line of the player looking at the display 134 of the display device 130 is obstructed. The player can look at a game image displayed on the display 134 of the display device 130 through the screen 132. When the laser is emitted from the gun-type controller 110 toward an arbitrary position on the display 134 of the display device 130, an image is focused by the laser on a position on the screen 132 corresponding to the arbitrary position on the display 134. The camera 120 photographs the whole of the screen 132 including the focused image to produce an image data.

The coin slot 140 is a slit where the player drops through a coin. The start button 150 is used when the player gives instructions to start the game.

The game operation section 160 controls the whole of the game apparatus 100. When the player inserts the coin in the coin slot 140 and presses the start button 150, a game program is read out from the ROM 190 and carried out. According to this, various game operation processing starts for calculating the display position of the target enemy character to instruct the image preparation section 180 to produce the game image. The game operation section 160 determines whether the game is over or not. For example, the game operation section 160 measures a lapsed time from the start of the game operation, and determines the game to be over when a predetermined time has passed from the start of the game. When the game is over, the game operation section 160 finishes a series of the game operation processing.

The game operation section 160 comprises an aiming position calculating section 162, an aiming area setting section 164, a movement setting section 166, a emission instruction judging section 168, a hit checking section 170 and a game direction section 172.

The aiming position calculating section 162 takes in the image data output from the camera 120 at predetermined intervals, and based on the image data, calculates the aiming position of the gun-type controller 110 set on the arbitrary position of the display 134 by the player. Specifically, the position on the screen 132 of the focused image of the laser emitted from the gun-type controller 110 is calculated with the image data output from the camera 120, and based on the position of the focused image, the aiming position on the display 134 is calculated.

Figure 3:
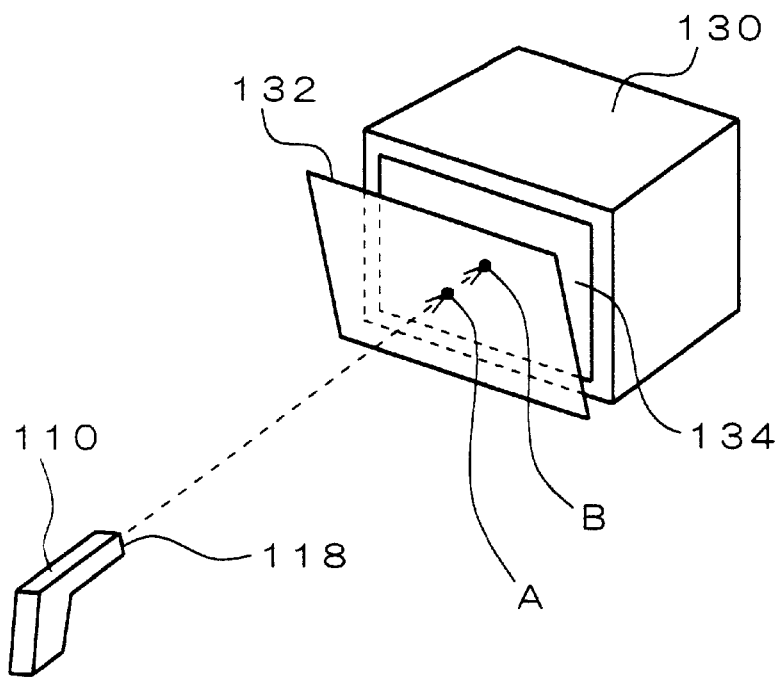
FIG. 3 is a view showing an example of detection of an aiming position.

FIG. 3 is a view showing a specific example of detecting an aiming position. As shown in the FIG. 3, when the player aims the muzzle 118 of the gun-type controller 110 on the display 134 of the display device 130, the laser emitted from the muzzle 118 passes through the screen 132 and arrives at the aiming position B of the display 134 of the display device 130. A focused image position A on the screen 132 is calculated by photographing the screen 132 using the camera 120, and based on the focused image position A, the aiming position B is calculated.

The aiming area setting section 164 sets, based on the aiming position on the display calculated by the aiming position calculating section 162, prescribed area including the aiming position (hereinafter referred to "aiming area"). The aiming area corresponds to a first area including the aiming position.

Figure 4:
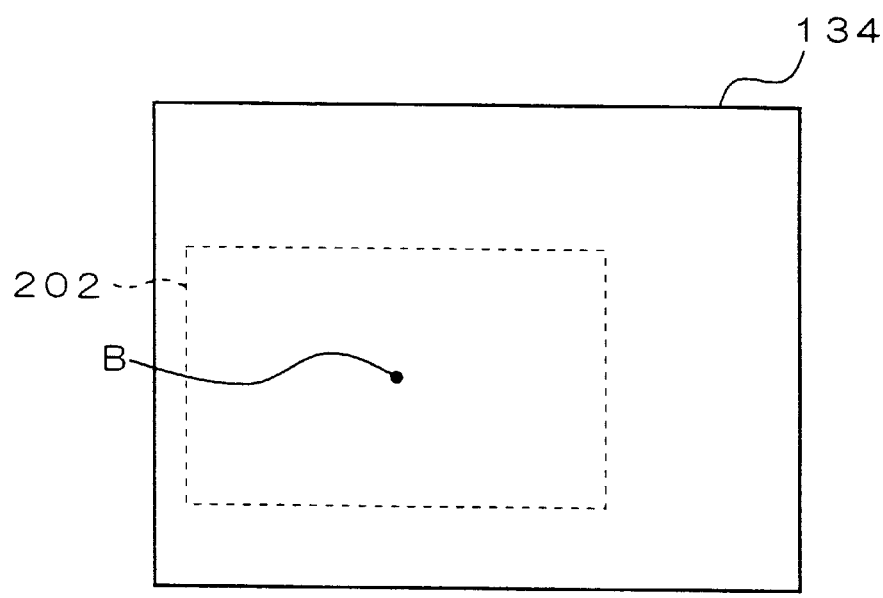
FIG. 4 is a view showing a specific example of an aiming area.

FIG. 4 is a view showing a specific example of an aiming area. As shown in FIG. 4, the aiming area setting section 164 sets a rectangular area including an aiming position B at its center (the area surrounded by a broken line) as an aiming area 202. The shape of the aiming area 202 is not limited to a rectangle but also other shapes may be used. For example, a square or a circular area including the aiming position at its center may be set as the aiming area.

The movement setting section 166 determines whether the display position of the enemy character is included in the aiming area 202, based on the aiming area 202 set by the aiming area setting section 164 and a position and a shape of the enemy character on the display 134 calculated by the predetermined game operation.

Figure 5:
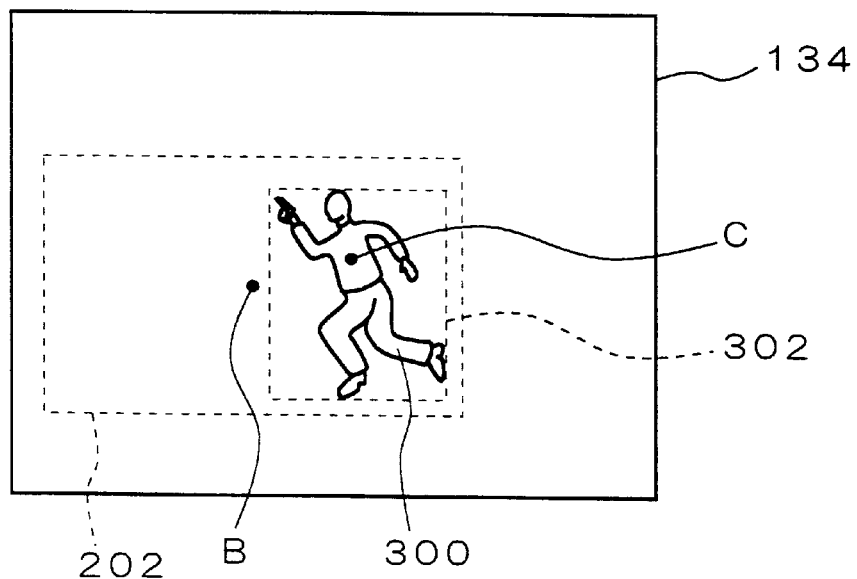
FIG. 5 is a view showing an example of a positional relationship between an enemy character and the aiming area.
Figure 6:
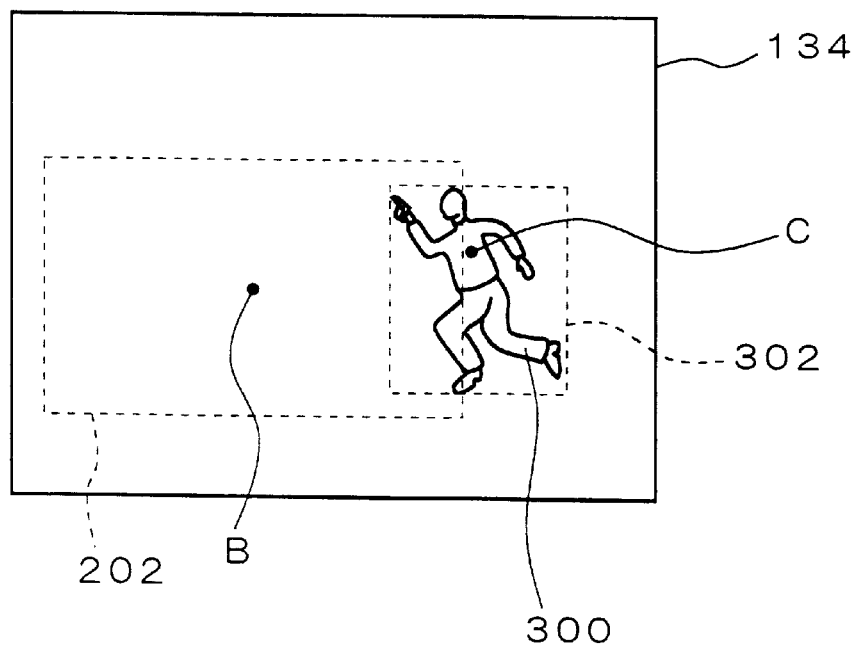
FIG. 6 is a view showing another example of a positional relationship between the enemy character and the aiming area.

FIGS. 5 and 6 are views showing a positional relationship between an enemy character 300 displayed on the display 134 and the aiming area 202. As shown in FIG. 5, when the whole of the enemy character 300 is included in the aiming area 202, the movement setting section 166 determines the display position of the enemy character 300 to be included in the aiming area 202. As shown in FIG. 6, when part of the enemy character 300 is included in the aiming area 202, the movement setting section 166 also determines the display position of the enemy character 300 to be included in the aiming area 202.

In the above described example, as shown in FIG. 6, it is regarded that the setting in the case where the part of the enemy character 300 is included in the aiming area 202 is identical to that in the case where the whole of the enemy character 300 is included in the aiming area 202. Alternatively, the setting may be changed such that the whole of the enemy character 300 is not included in the aiming area 202 when only the part of the enemy character 300 is included in the aiming area 202. In the case where the enemy character 300 has a complicated shape or an ever-changing shape, it is not easy to check whether the part of the enemy character 300 is included in the aiming area 202. For this reason, as shown in FIGS. 5 and 6, a character area 302 may be set which has a size almost identical to that of the enemy character 300 so as to determine whether the whole or the part of the character area 302 is included in the aiming area 202 and thereby to permit the operation processing to be simple. Alternatively, as shown in FIGS. 5 and 6, a point C inside (or outside) the enemy character 300 may be set as a display position of the enemy character 300 tentatively so as to determine whether the point C is included in the aiming area 202 or not and thereby to further permit the operation processing to be simple.

Figure 7:
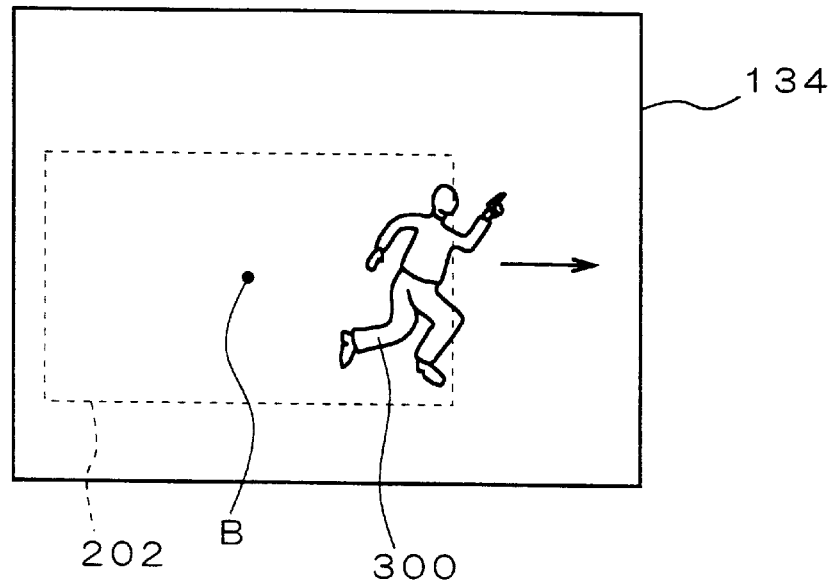
FIG. 7 is a view showing an example of a prescribed movement which the enemy character is made to perform.
Figure 8:
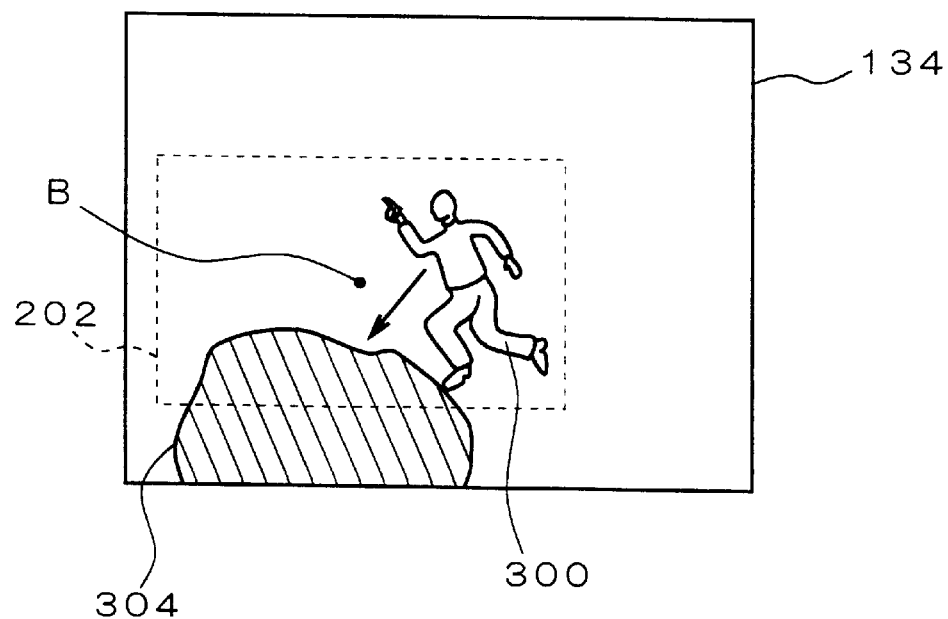
FIG. 8 is a view showing another example of the prescribed movement which the enemy character is made to perform.

When judging the display position of the enemy character 300 to be included in the aiming area 202, the movement setting section 166 outputs instructions toward a game direction section 172 to have the enemy character 300 perform a prescribed movement. The enemy character 300 may be made to perform the prescribed movement such as, in a shooting game shooting a bullet at the enemy character, running the enemy character 300 in the direction going away from the aiming position B (the right direction in FIG. 7) or running the enemy character 300 at a short distance to hide an obstruction (a rock 304 at the lower section of the aiming position B in FIG. 8) which is obstruction for the player. The enemy character 300 may be also made to wear a fearful look or perform a fearful movement. When the enemy character 300 is not included in the aiming area 202, no specific instructions for the prescribed movement are output from the movement setting section 166 toward the game direction section 172.

The emission instruction judging section 168 watches presence or absence of a trigger signal output the gun-type controller 110 and, when detecting the trigger signal, determines the player to give instructions to fire a virtual bullet and outputs a firing instruction signal to the hit checking section 170.

When the firing instruction signal is output from the emission instruction judging section 168, the hit checking section 170 determines whether the virtual bullet hits the enemy character 300 or not based on the position and the shape of the enemy character calculated by the predetermined game operation and the aiming position detected by the aiming position calculating section 162. This determination of the hit is made on not only the enemy character 300 near the aiming position B as shown in FIG. 5 but also all the enemy characters included in the display 134. In this way, the result of the hit checking by the hit checking section 170 is transmitted to the game direction section 172.

The game direction section 172 carries out the predetermined game operation with respect to the shooting game according to the present embodiment and thereby carries out an arrangement and a movement of the enemy character or various arrival bullet processing or the like depending upon the presence or absence of the hit of the virtual bullet fired from the gun-type controller 110. For example, when the hit checking section 170 does not determine the hit (when the emission instruction judging section 168 does not output the firing instruction signal), the predetermined game operation is carried out in accordance with the game program so as to bring the enemy character into sight or to move the same. When the hit checking section 170 determines the hit and the result of the determination is affirmative (in the case of the presence of the hit), the arrival bullet processing is carried out depending upon the kind of the enemy character such that the enemy character hit by the bullet is wounded, destroyed or exploded. When the result of the determination is negative on the contrary (in the case of the absence of the hit), the arrival bullet processing is carried out such as to leave a bullet hole on a ground or other backgrounds at which the bullet arrives.

When the instructions to make the enemy character 300 to perform the prescribed movement are transmitted from the movement setting section 166, even if the hit checking section 170 does not determine the hit, the game direction section 172 make the enemy character 300 only whose display position is included in the aiming area 202 to perform the prescribed movement. This processing is carried out for each enemy character 300 when the aiming area 202 includes the display positions of a plurality of enemy character 300. In this way, when the aiming area 202 includes the display positions of the plurality of enemy character 300, it is not necessary to make each enemy character 300 to perform the same movement but the prescribed movement for each enemy character 300 is separately set. For example, in the case where the display positions of three enemy characters A, B and C are included in the aiming area 202, it is possible to make the enemy character A to perform an escaping movement in the direction going away from the aiming position, to make the enemy character B to perform a hiding movement behind the obstruction, and to make the enemy character C to perform a fearful movement. The combinations of the enemy characters and the kinds of the prescribed movements may be set at random in each case or previously set for each enemy character.

The image preparation section 180 produces a predetermined game image depending upon an image producing instruction output from the game operation section 160. The produced game image is displayed on the display 134 of the display device 130. Specifically, a three-dimensional game space is composed of various kinds of two-dimensional or three-dimensional objects corresponding to the enemy character and the background. The image producing instruction including the arrangement and the direction of the objects and a virtual viewpoint position is transmitted from the game direction section 172 to the image preparation section 180. In the image preparation section 180, the game image, for one screen corresponding to the display 134 of the display device 130 is produced by perspective projection conversion based on the specified viewpoint position. The producing movement of the game image is performed at predetermined intervals (for example, every ¹⁄₆₀ second) and the game image displayed on the display device 130 is renewed at this intervals.

The gun-type controller 110, the camera 120, the screen 132 and the aiming position calculating section 162 described above correspond to position specifying unit, the aiming area setting section 164 and the movement setting section 166 correspond to character movement setting unit, and the image preparation section 180 and the display device 130 corresponds to display unit. The aiming position calculating section 162 corresponds to aiming position calculating unit.

Figure 9:
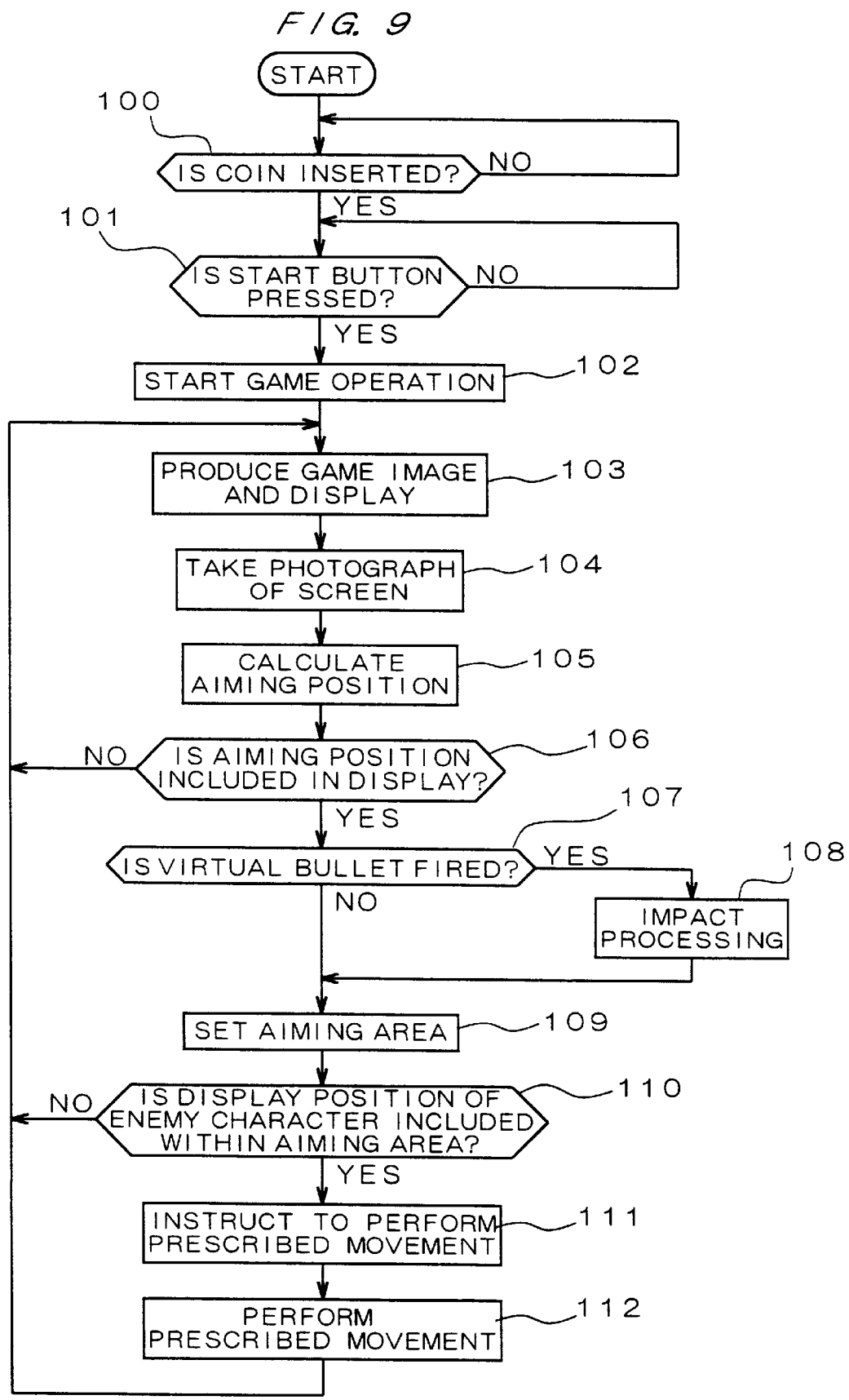
FIG. 9 is a flow chart showing an operation procedure of the game apparatus.

Next, operation of the game apparatus according to the present embodiment will be described. FIG. 9 is a flow chart of an operation procedure of the game apparatus 100. The game operation section 160 determines whether the player puts a coin in the coin slot 140 or not (step 100). When the coin is dropped through, then, the game operation section 160 determines whether the player presses the start button 150 or not (step 101). When the start button 150 is pressed, the game operation section 160 carries out the game program stored in the ROM 190 to start the shooting game (step 102).

When the game is started, the image preparation section 180 produces the game image including various objects such as the enemy character and the background to be displayed on the display device 130 based on the image producing instruction output from the game direction section 172 (step 103). The camera 120 takes a photograph of the screen 132 arranged in front of the display device 130 (step 104).

Next, the aiming position calculating section 162 calculates the aiming position based on the image data output from the camera 120 having photographed the screen 132 (step 105) and determines whether the aiming position is included in the display 134 (step 106). In the game apparatus 100 according to the present embodiment, the aiming position can be detected independent of the operation of the trigger 114 provided on the gun-type controller 110. Therefore, the case where the aiming position is not included in the display 134 means the case where the player does not aim the muzzle 118 of the gun-type controller 110 at the display 134 of the display device 130. In this case, the determination in the step 106 is negative, and after the game direction section 172 moves each object in the game space and carries out occurrence processing of an event based on the game programs, the above described processing of step 103 (producing the game image and display processing) and the subsequent processing are repeated.

When the aiming position is included in the display 134, the determination in the step 106 is affirmative, and then the game direction section 172 determines whether the virtual bullet is fired from the gun-type controller 110 or not (step 107). This determination is carried out by checking whether the firing instruction signal is output from the emission instruction judging section 168. When the bullet is fired, the determination in the step 107 is affirmative and the game direction section 172 carries out the bullet impact processing (step 108). As described above, the contents of the process for after the impact are different depending upon the presence or absence of the hit of the bullet on the enemy character, so that the impact processing is carried out depending upon the result of the hit determination by the hit checking section 170.

After such bullet firing determination processing (step 107) or such impact processing (step 108), or at the same time as the processing, the aiming area setting section 164 sets the prescribed rectangular area including the aiming position at its center as the aiming area 202 (step 109). Then, the movement setting section 166 determines whether the display position of the enemy character is included in the aiming area 202 set by the aiming area setting section 164 (step 110). When included, the movement setting section 166 transmits the instructions to the game direction section 172 so as to make the enemy character to perform the prescribed movement (step 111). The game direction section 172 having received the instructions carries out the game operation for making the enemy character included in the aiming area 202 to perform the prescribed movement (step 112).

When the display position of the enemy character is not included in the aiming area 202, or when included and the processing of making the enemy character to perform the prescribed movement is finished, the above described processing of the step 103 (producing the game image and display) and the subsequent processing are repeated.

In this way, the game apparatus 100 according to the present embodiment always or at any time detects the aiming position independent of the operation of the trigger 114 provided on the gun-type controller 110 and sets the aiming area 202 around the position. When the display position of the enemy character is included in the aiming area 202, the movement setting section 166 transmits the instructions to make the enemy character to perform the prescribed movement to the game direction section 172 and the prescribed movement is performed. Accordingly, when the player changes the direction of the muzzle 118 of the gun-type controller 110 to move the aiming position and to settle the aiming position on the enemy character on the display 134, the game performance can be performed such that the enemy character takes natural actions such as escaping, hiding or being scared, thereby permitting enhancing the reality of the game.

By the way, in the above description of the present embodiment, the prescribed movement which the enemy character is made to perform when the display position of the enemy character is included in the aiming area is set independent of the movement of the enemy character performing at the time. Alternatively, the movements may be associated with each other. Namely, the subsequent movement may be changed depending upon the movement of the aimed enemy character performing at the time. In this case, the movement setting section 166 determines the movement of the enemy character included in the aiming area 202, and considering the result of the determination, the movement is decided to instruct the game direction section 172 for prescribed movement. Practically, the movement setting section 166 may determine only whether the display position of the enemy character is included in the aiming area 202, and set prescribed movement depending upon the movement of the enemy character at the game direction section 172.

As specific examples of variably set prescribed movements, for example, the enemy character performs movements such as escaping or giving up when the enemy character is loading the gun and cannot fight back against the attack by the player, and on the contrary, the enemy character performs a fighting back movement when the gun is loaded and the enemy character keeps a posture for fighting back. In this way, the movement of the enemy character when the aiming position comes near is variably set depending upon the movement of the enemy character at that time, thereby achieving more natural acting pattern and further permitting enhancing the reality.

Figure 10:
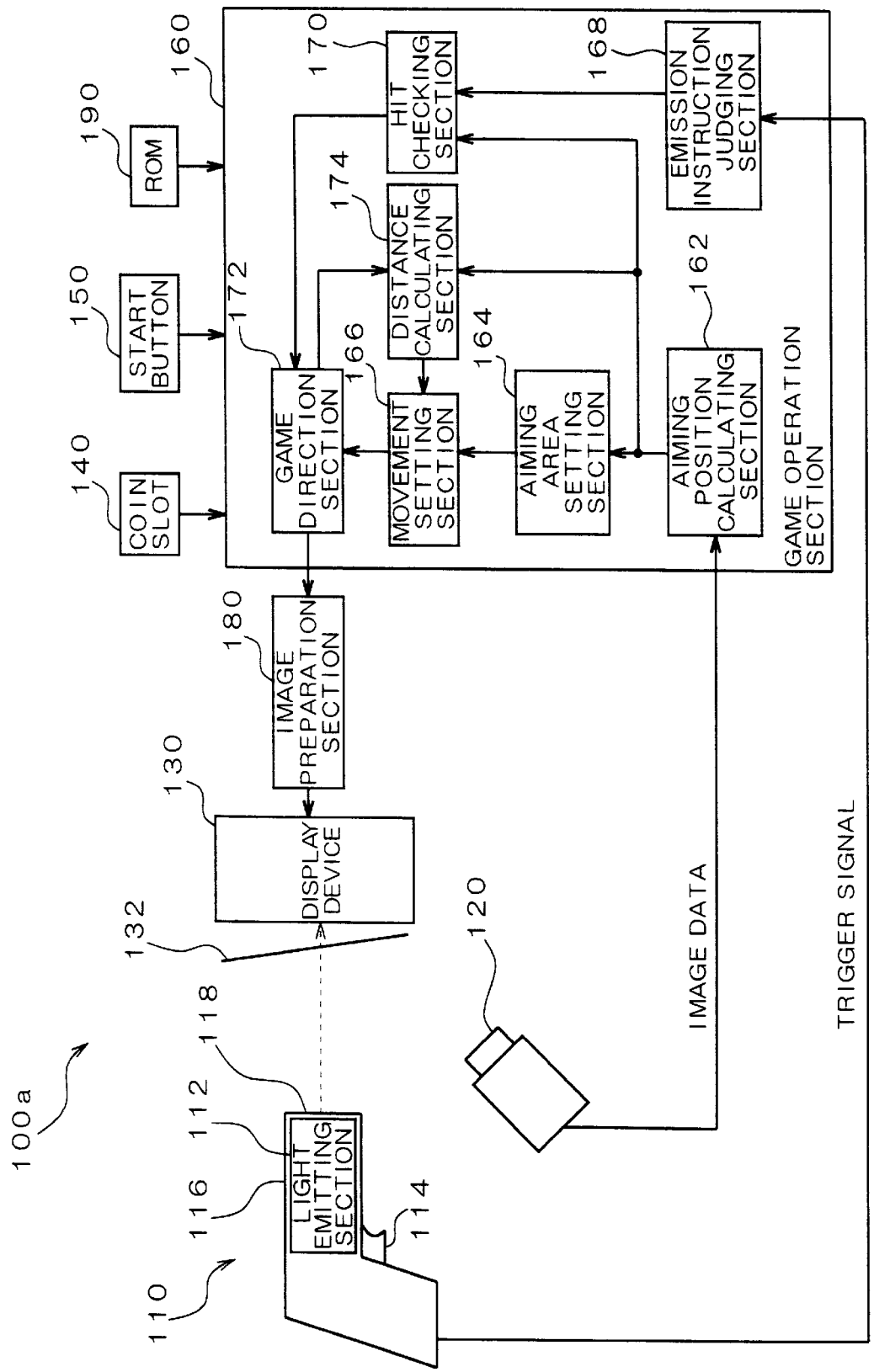
FIG. 10 is a view showing a configuration of the game apparatus wherein the prescribed movement which the enemy character is made to perform is variably set in view of a distance between a display position of the enemy character and the aiming position.

The prescribed movement which the enemy character is made to perform may be variably set depending upon the distance between the display position of the enemy character and the aiming position. FIG. 10 is a view showing a configuration of the game apparatus wherein the prescribed movement which the enemy character is made to perform is variably set in view of the distance between the display position of the enemy character and the aiming position. The game apparatus 100a shown in FIG. 10 is different from the game apparatus 100 shown in FIG. 1 in that a distance calculating section 174 is added. The distance calculating section 174 corresponds to distance calculating unit.

Based on the display position of the enemy character calculated by the game direction section 172 and the aiming position calculated by the aiming position calculating section 162, the distance calculating section 174 calculates the distance there between. When the display position of the enemy character is included in the aiming area 202, the movement setting section 166 sets the movement which the enemy character is made to perform, based on the distance between the display position of the enemy character and the aiming position calculated by the distance calculating section 174, and transmits the movement instruction corresponding to the set movement to the game direction section 172. The game direction section 172 make the enemy character to perform the prescribed movement as instructed in accordance with the movement instruction transmitted from the movement setting section 166.

As specific examples of variably set prescribed movements, for example, the enemy character performs escaping movement or hiding behind the obstruction movement when the aiming position is relatively far from the display position of the enemy character and a giving up movement when the aiming position is close to the display position of the enemy character. Alternatively, in the case where the enemy character performs only escaping movement from the aiming position, the enemy character escapes slowly when the aiming position is relatively far from the display position of the enemy character and the enemy character escapes quickly when the aiming position is close to the display position of the enemy character. In this way, the prescribed movement of the enemy character is variably set depending upon the distance between the display position of the enemy character and the aiming position, thereby achieving more natural acting pattern and further permitting enhancing the reality of the game.

Figure 11:
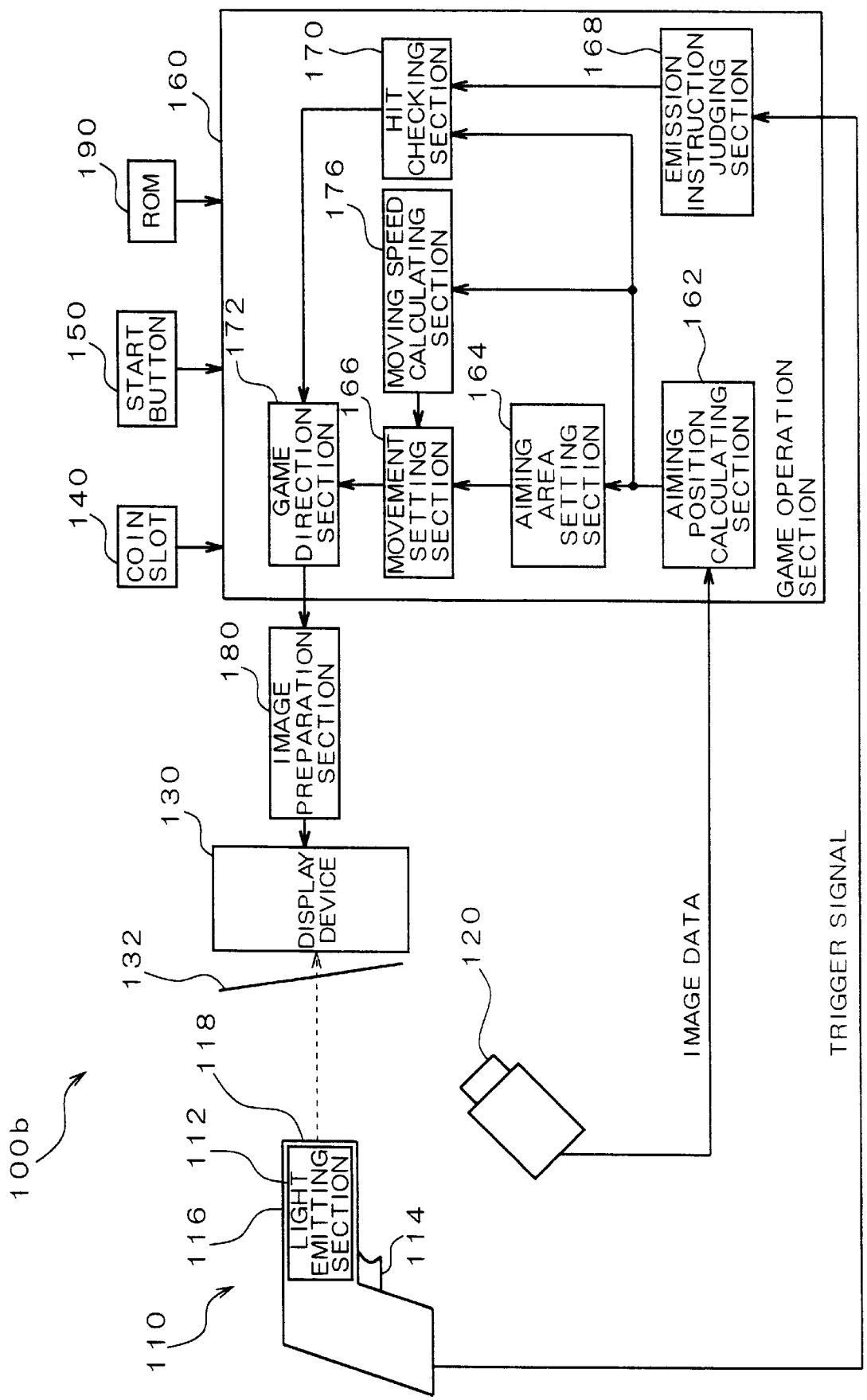
FIG. 11 is a view showing a configuration of the game apparatus wherein the prescribed movement which the enemy character is made to perform is variably set in view of a moving speed of the aiming position.

The prescribed movement which the enemy character is made to perform may be variably set depending upon the moving speed of the aiming position. FIG. 11 is a view showing a configuration of the game apparatus wherein the prescribed movement which the enemy character is made to perform is variably set in view of the moving speed of the aiming position. The game apparatus 100b shown in FIG. 11 is different from the game apparatus 100 shown in FIG. 1 in that a moving speed calculating section 176 is added. The moving speed calculating section 176 corresponds to moving speed calculating unit.

The moving speed calculating section 176 calculates the moving speed of the aiming position based on the aiming position calculated by the aiming position calculating section 162. When the display position of the enemy character is included in the aiming area 202, the movement setting section 166 sets the prescribed movement which the enemy character is made to perform based on the moving speed of the aiming position calculated by the moving speed calculating section 176, and transmits the movement instruction corresponding to the set movement to the game direction section 172. The game direction section 172 makes the enemy character to perform the prescribed movement as instructed in accordance with the movement instruction transmitted from the movement setting section 166.

As specific example of variably set prescribed movements, for example, the enemy character performs a quickly escaping movement when the aiming position approaches the enemy character at a high speed and a slowly escaping movement when the aiming position approaches the enemy character slowly. In this way, the prescribed movement of the enemy character is variably set depending upon the moving speed of the aiming, thereby achieving more natural acting pattern and further permitting enhancing the reality of the game.

In the above described embodiment, the enemy character is made to continuously perform the prescribed movement when the display position of the enemy character is included in the aiming area 202. Alternatively, the continuous movement may be suspended under certain conditions even if the display position is included in the aiming area 202. For example, the movement setting section 166 may clock time after the instruction to have the enemy character to hide behind the obstruction and instruct to suspend the movement after a predetermined time passed.

When the enemy character hides behind the obstruction and the aiming position does not move from the vicinity of the obstruction, the enemy character never come out from behind the obstruction, so that the game lacks variety in its development and amusement. Therefore, transmitting the instructions from the movement setting section 166 to the game direction section 172 to suspend the prescribed movement by the enemy character after a given period of time brings the enemy character in sight out of the obstruction. Accordingly, the player may attack the enemy character just emerging from the obstruction with precise timing. In this way, the prescribed movement which the enemy character is made to perform may be suspended to bring variations on the game, thereby permitting increase in amusement of the game.

In the above described embodiment, the rectangular area including the aiming position is set as the aiming area 202 and the enemy character is made to perform the prescribed movement when the display position of the enemy character is included in the aiming area 202. Alternatively, a predetermined area including the display position of the enemy character may be set as a character area and the enemy character may be made to perform the prescribed movement when the aiming position is included in the character area. The character area corresponds to a second area including the display position of the enemy character.

Figure 12:
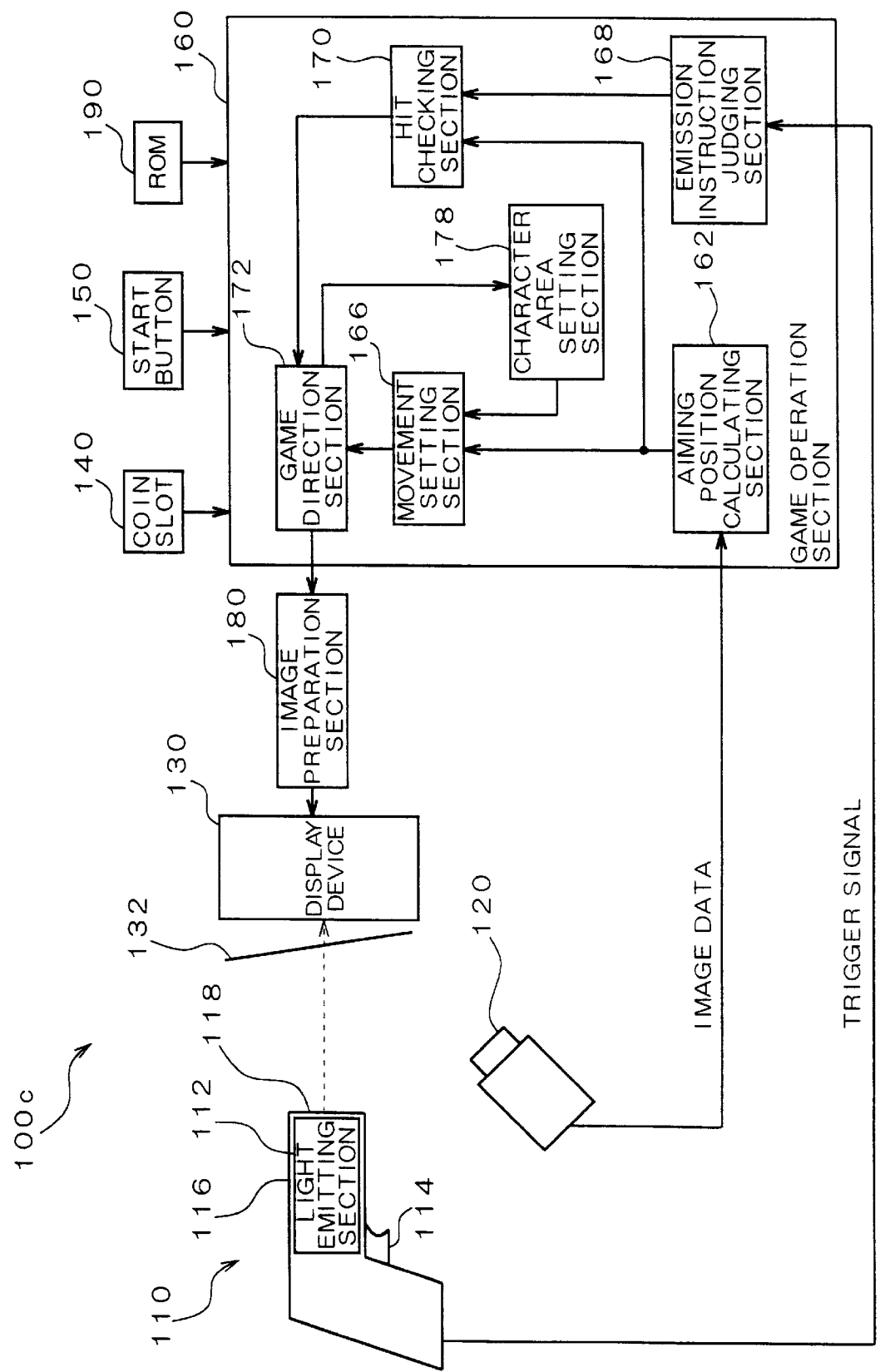
FIG. 12 is a view showing a configuration of the game apparatus wherein the character area is set to make the enemy character to perform the prescribed movement.

FIG. 12 is a view showing a configuration of the game apparatus wherein the character area is set to make the enemy character to perform the prescribed movement. The game apparatus 100c shown in FIG. 12 is different from the game apparatus 100 shown in FIG. 1 in that a character area setting section 178 is newly added and that the aiming area setting section 164 is deleted.

Figure 13:
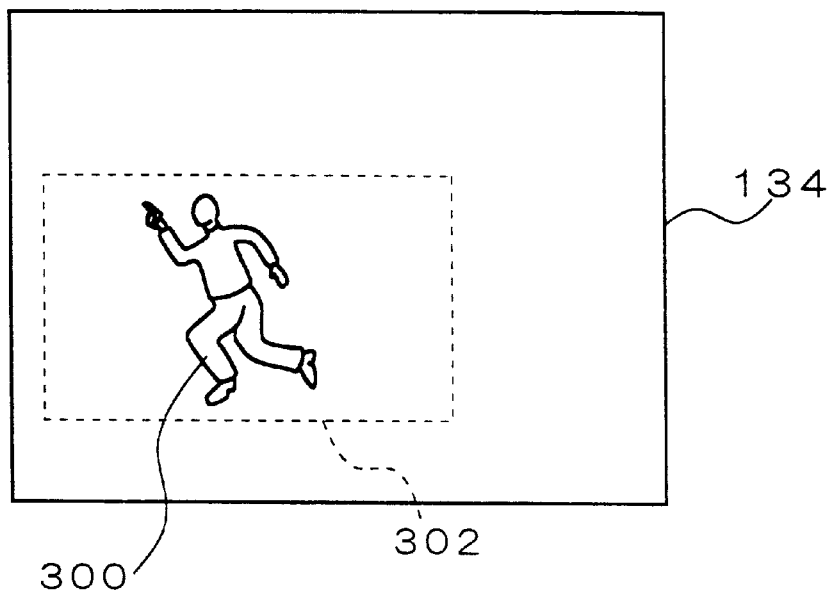
FIG. 13 is a view showing a specific example of the character area.

Based on the display position of the enemy character set by the game direction section 172, the character area setting section 178 sets a predetermined rectangular area including the display position as the character area. FIG. 13 is a view showing a specific example of the character area set on the display 134. As shown in FIG. 13, the character area setting section 178 sets the rectangular area including the enemy character 300 as a character area 302. Like the aiming area 202, the character area 302 may be set in any predetermined shape other than rectangle (square or circle).

Figure 14:
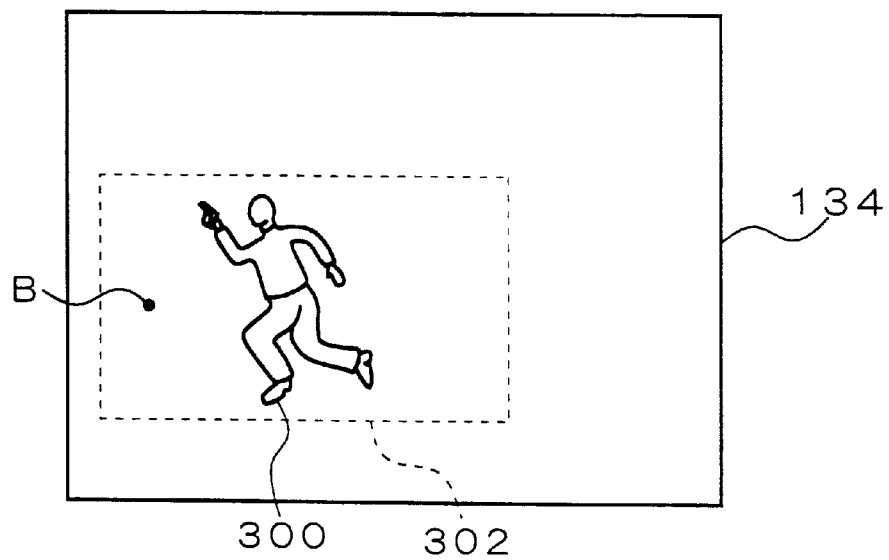
FIG. 14 is a view showing an example of a positional relationship between the character area and the aiming position.
Figure 15:
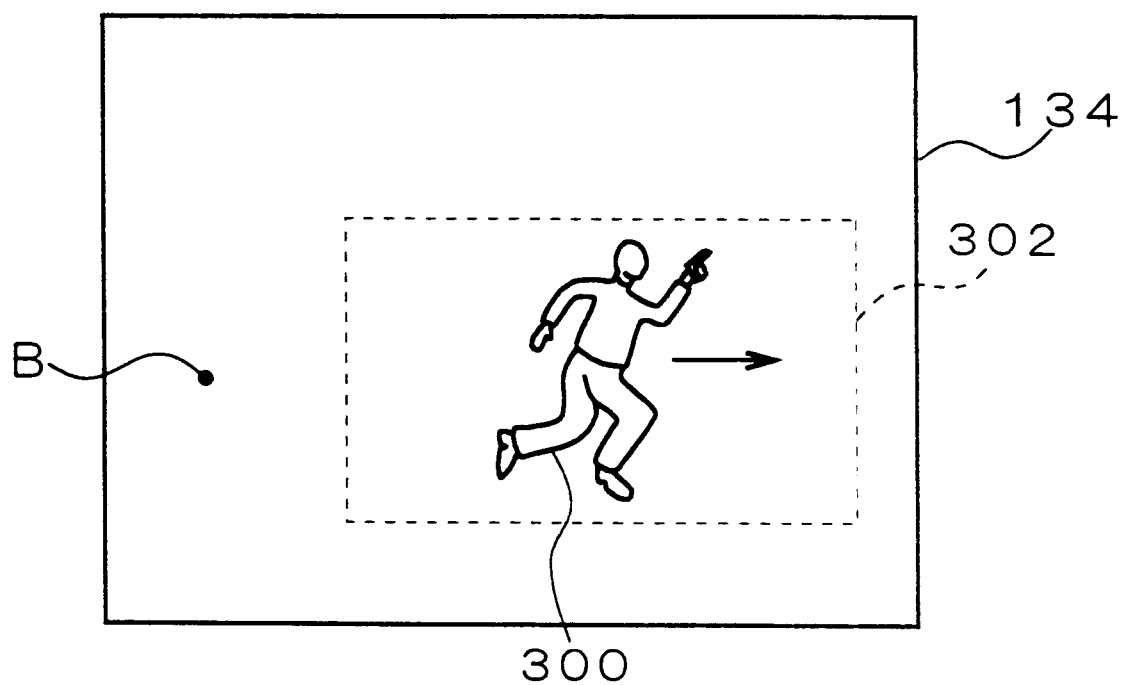
FIG. 15 is a view showing another example of a positional relationship between the character area and the aiming position.

Based on the character area 302 set by the character area setting section 178 and the aiming position calculated by the aiming position calculating section 162, the movement setting section 166 determines whether the aiming position is included in the character area 302. FIG. 14 is a view showing a positional relationship between the character area 302 and the aiming position B set on the display 134. The movement setting section 166 determines whether the aiming position B is included in the character area 302 as shown in FIG. 14 or not included in the character area 302 as shown in FIG. 15. When the plurality of the enemy character 300 are displayed on the display 134, the character area 302 is set with respect to each enemy character 300. In this case, a size, a shape and the like of the corresponding character area 302 may be variably set depending upon the size, the shape and the like of each enemy character 300.

When the aiming position B is included in the character area 302, the movement setting section 166 transmits the movement instruction to make the enemy character 300 to perform the prescribed movement to the game direction section 172. The game direction section 172 having received the movement instruction carries out the game operation for making the enemy character 300 to perform the prescribed movement. The prescribed movement in this case is identical to the prescribed movement which the enemy character 300 is made to perform using the above described aiming area 202, and includes at least an escaping movement or a fearful movement by the enemy character 300 in the shooting game. For example, as shown in FIG. 14, when the aiming position B is included in the character area 302 and the aiming position B is in a left direction of the enemy character 300, the movement setting section 166 transmits to the game direction section 172 the movement instruction to make the enemy character 300 to perform an escaping movement in a right direction on the display 134. Consequently, as shown in FIG. 15, the game direction section 172 directs the game such that the enemy character 300 moves to the position apart from the aiming position B.

In this way, in the game apparatus 100c shown in FIG. 12, the character area setting section 178 sets the character area 302 around the enemy character 300, and when the aiming position B is included in the character area 302, the movement setting section 166 transmits to the game direction section 172 the instruction to make the enemy character 300 to perform the prescribed movement and then the prescribed movement is carried out. Accordingly, when the player changes the direction of the muzzle 118 of the gun-type controller 110 to move the aiming position so as to match the aiming position with the enemy character on the screen, the game performance can be carried out such that the enemy character takes natural actions such as escaping, hiding or being scared, thereby permitting enhancing the reality of the game.

In the various game apparatus described above, the aiming area 202 is set around the aiming position or the character area 302 is set around the enemy character, and when each area includes the display position of the enemy character or the aiming position, the enemy character is made to perform the prescribed movement. Alternatively, the time between a start of the movement of the aiming position and its arrival at near the enemy character is predicted and when the prediction time is within the predetermined time, the enemy character may be made to perform the prescribed movement.

Figure 16:
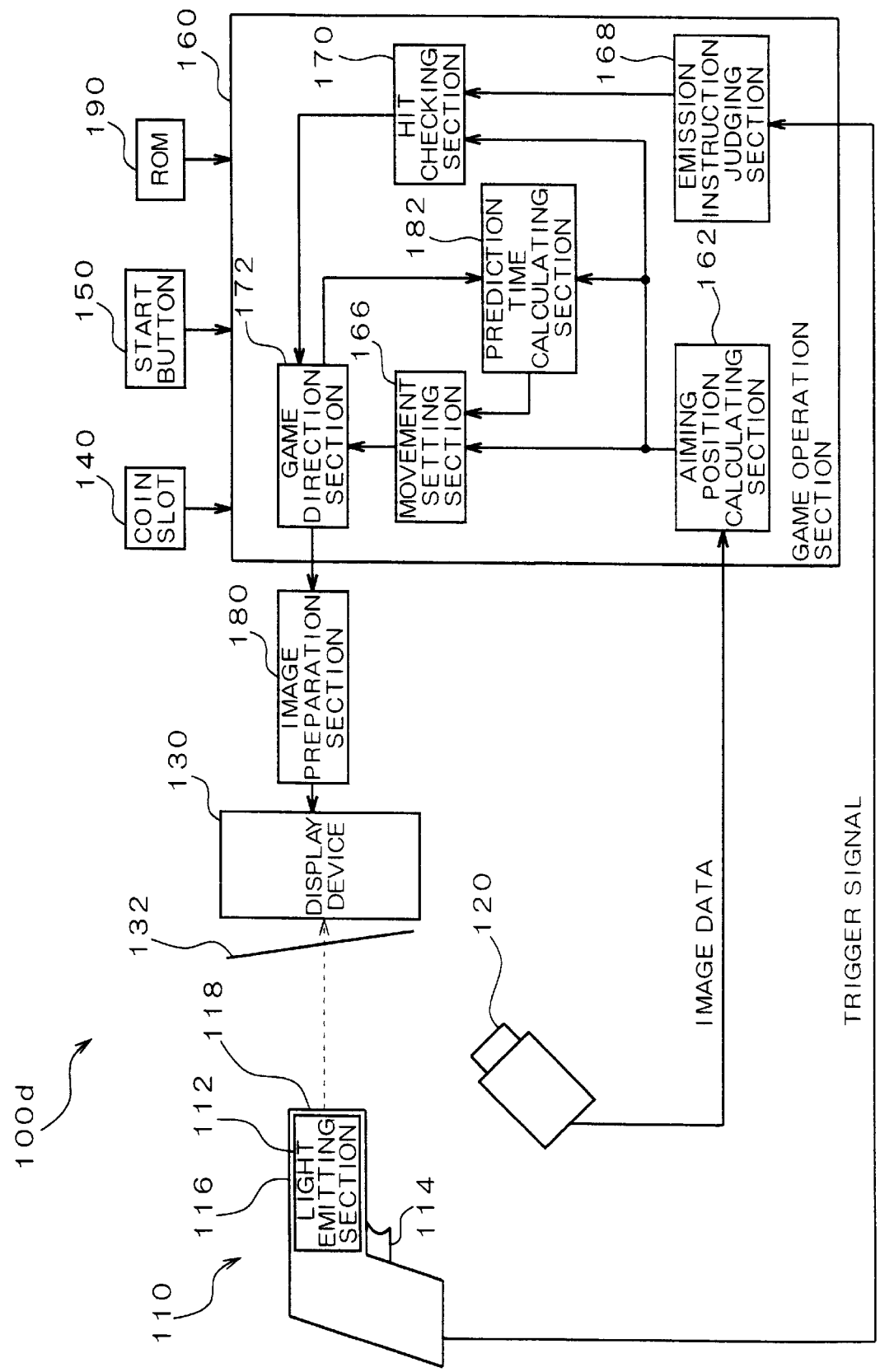
FIG. 16 is a view showing a configuration of the game apparatus wherein the prediction time between a start of the movement of the aiming position and its arrival at near the enemy character is calculated to make the enemy character to perform the prescribed movement.

FIG. 16 is a view showing a configuration of the game apparatus wherein the prediction time between the start of the movement of the aiming position and its arrival at near the enemy character is calculated to make the enemy character to perform the prescribed movement. The game apparatus 100d shown in FIG. 16 is different from the game apparatus 100 shown in FIG. 1 in that a prediction time calculating section 182 is added and that the aiming area setting section 164 is deleted. The prediction time calculating section 182 corresponds to arrival time prediction unit.

Figure 17:
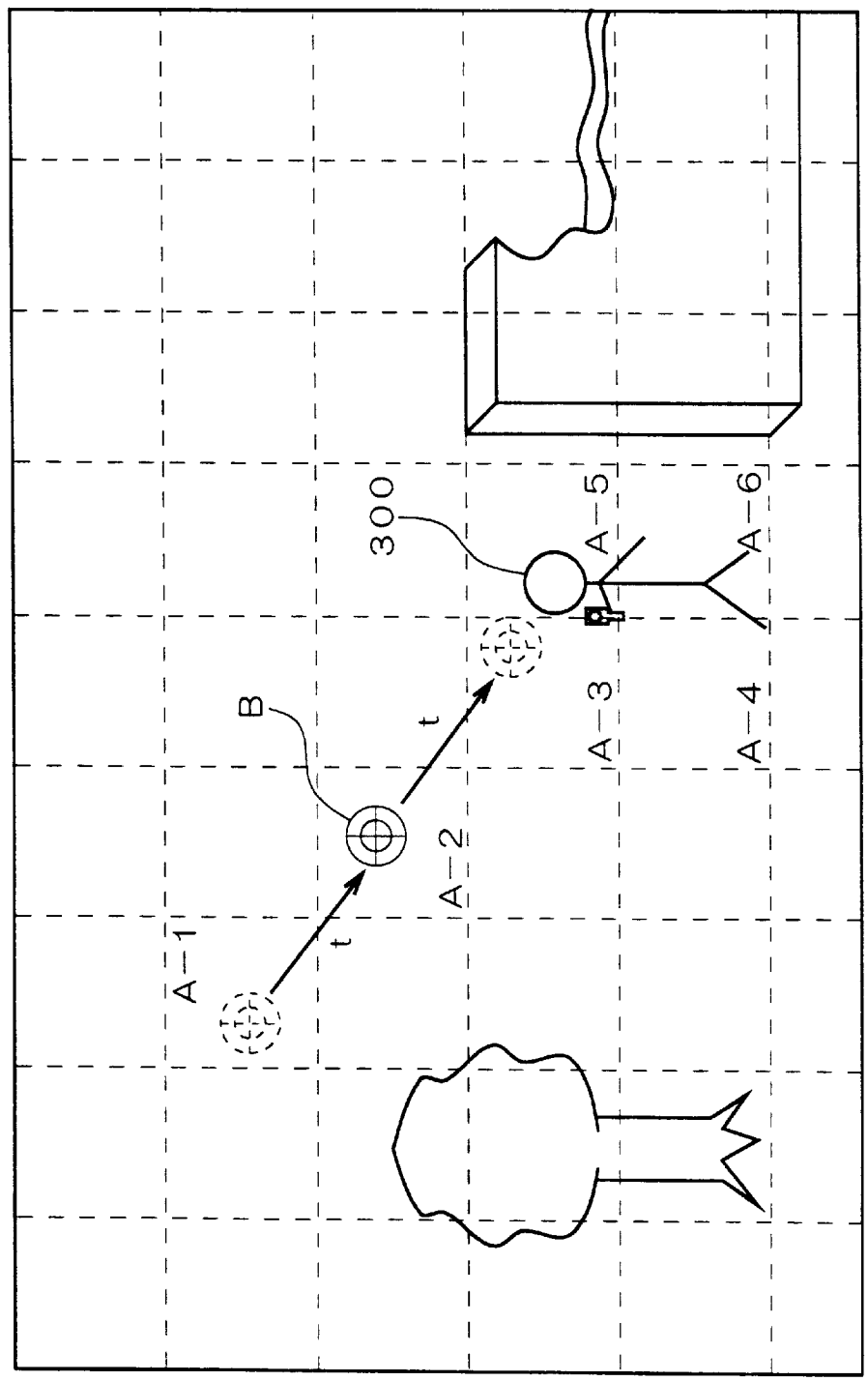
FIG. 17 is a view showing a calculating method of a prediction time.

The prediction time calculating section 182 divides the whole of the display 134 into a plurality of parts and calculates a prediction time which it takes the divided area including the aiming position to match with the divided area including the enemy character (corresponding to a third area). FIG. 17 is a view showing a calculation method of the prediction time by the prediction time calculating section 182. In an example shown in FIG. 17, the prediction time calculating section 182 divides the display 134 into almost five parts longitudinally and 8 parts laterally, and calculates a divided area A-2 including the aiming position B, based on the aiming position B calculated by the aiming position calculating section 162. If the aiming position B is included in a divided area A-1 t seconds before, the prediction time calculating section 182 determines whether the aiming position B moves and arrives at any of four divided areas A-3, A-4, A-5, A-6, and if there is an arrival, calculates the time taken to arrive. In an example shown in FIG. 17, a divided area A-3 at which the aiming position B arrives t seconds later is one of four divided areas including the enemy character 300, so that the prediction time calculating section 182 calculates the prediction time t which it takes the aiming position B to arrive at near the enemy character 300. The movement setting section 166 transmits the instructions to make the enemy character 300 to perform the prescribed movement to the game direction section 172, when the prediction time calculated by the prediction time calculating section 182 is within the predetermined time, and the game direction section 172 having received the instruction makes the corresponding enemy character 300 to perform the prescribed movement.

In this way, the time which it takes the aiming position B to arrive at near the enemy character 300 is predicted, and when the prediction time is within the predetermined time, the movement setting section 166 transmits the instruction to make the enemy character 300 to perform the prescribed movement to the game direction section 172 and the prescribed movement is carried out. Accordingly, when the player changes the direction of the muzzle 118 of the gun-type controller 110 to move the aiming position so as to match the aiming position with the enemy character on the screen, the game performance can be carried out such that the enemy character takes natural actions such as escaping, hiding or being scared, thereby permitting enhancing the reality of the game.

Figure 18:
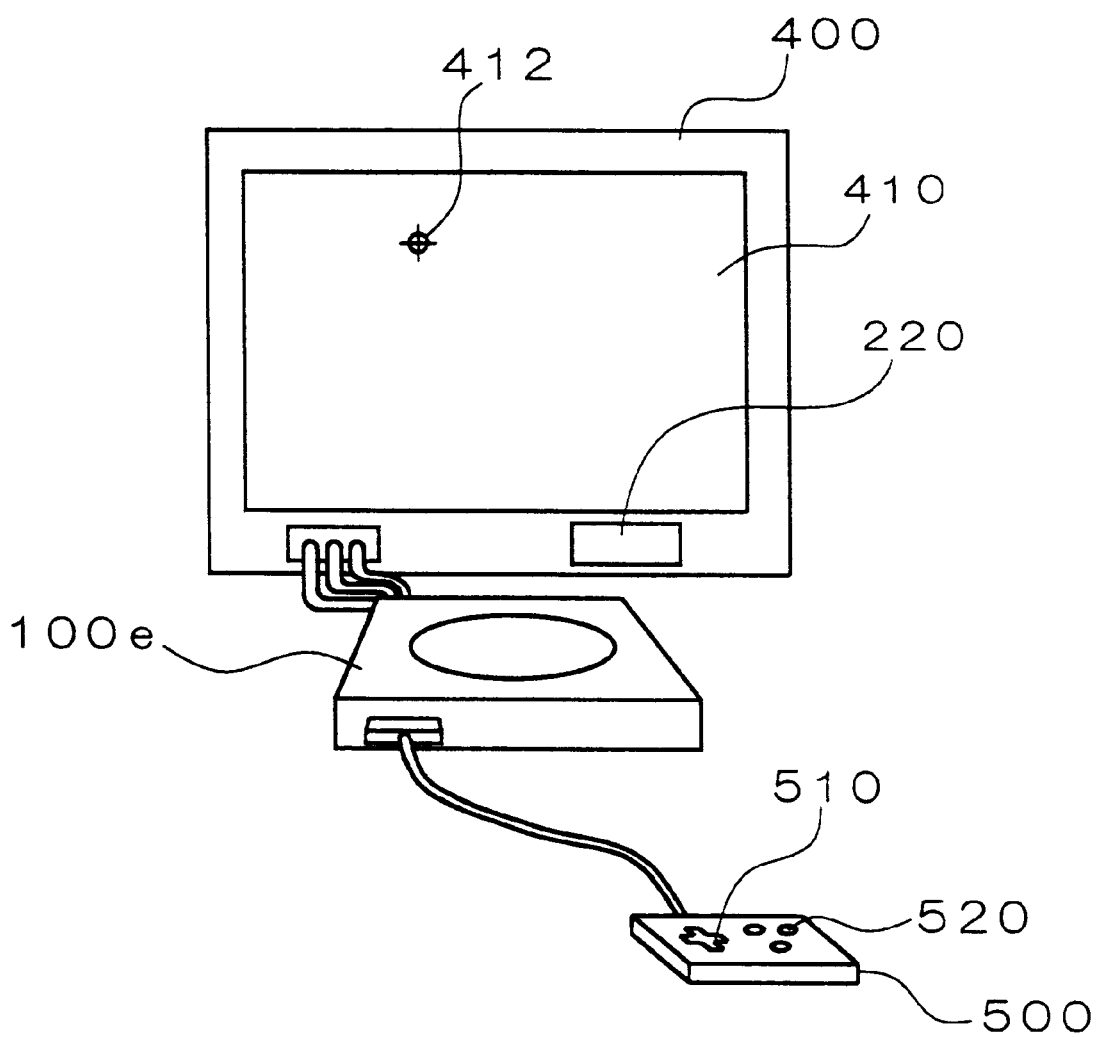
FIG. 18 is a view schematically showing a game apparatus using a dedicated controller provided with a cross cursor key.

It will be understood that the present invention is not limited to the above embodiments and that various changes and modifications may be made without departing from the scope of the invention. For example, in the above described embodiments, descriptions are made with respect to the game apparatus 100 for business use with the gun-type controller 110. Instead of using the gun-type controller 110, the present invention may be applied to a game apparatus for domestic use with a dedicated controller having a movement operation section such as a cross cursor key or a joystick. In this case, a display position of a prescribed indication moving on the display 134 depending upon the operation of the movement operation section may be regarded to be equivalent to the above described aiming position. FIG. 18 is a view schematically showing a configuration of a game apparatus 100e using the dedicated controller with the cross cursor key and shows a condition where the game apparatus 100e for domestic use is connected with an external display device 400.

In FIG. 18, a dedicated controller 500 connected to the game apparatus 100e comprises a cross cursor key 510 necessary for moving a position of an indication 412 displayed on the display 410 of the display device 400 and a button switch 520 for inputting various instructions. When playing a shooting game using the dedicated controller 500, operating the cross cursor key 510 to move the indication 412 on the display 410 enables the aiming position to match with an arbitrary position on the display 410. Pushing the button switch 520 in a condition where the aiming position matches with the enemy character brings a virtual bullet to be fired at the enemy character. Accordingly, in the game apparatus 100e whereto the present invention is applied, the game operation is carried out such that the enemy character is made to perform the prescribed movement when the player operates the cross cursor key of the dedicated controller 500 to bring the indication 412 on the display 410 close to the enemy character.

Further, in the above described embodiment, the aiming position on the display 134 is calculated by photographing the focused position of the laser emitted from the muzzle 118 of the gun-type controller 110. Alternatively, other method may be used as a mechanism for calculating or detecting the aiming position on the display 134. For example, a gun-type controller in a fixed seat type may be used which is engaged at its part with a casing or the like, and based on the direction of the body of the gun controller, the aiming position on the screen may be decided. Alternatively, a display device in a raster scanning type and gun-type controller having a light reception section may be used. In this case, the whole of the screen is lightened concurrently, and the arbitrary point is detected by clocking the time which it takes the arbitrary point on the screen on which the muzzle is pointed to be lighted. The aiming position on the screen can be decided by repeating above described processing at predetermined intervals.

In the above described embodiment, the prescribed movement which the enemy character is made to perform is an avoiding movement going away from the aiming position so that the shooting of the enemy character comes to be difficult, which increases the difficulty of the game. On the contrary, making the enemy character to move close to the aiming position may decrease the difficulty of the game. In this case, even a beginner player can easily shoot the enemy character so that the amusement of the game is increased to satisfy such a player.

Figure 19:
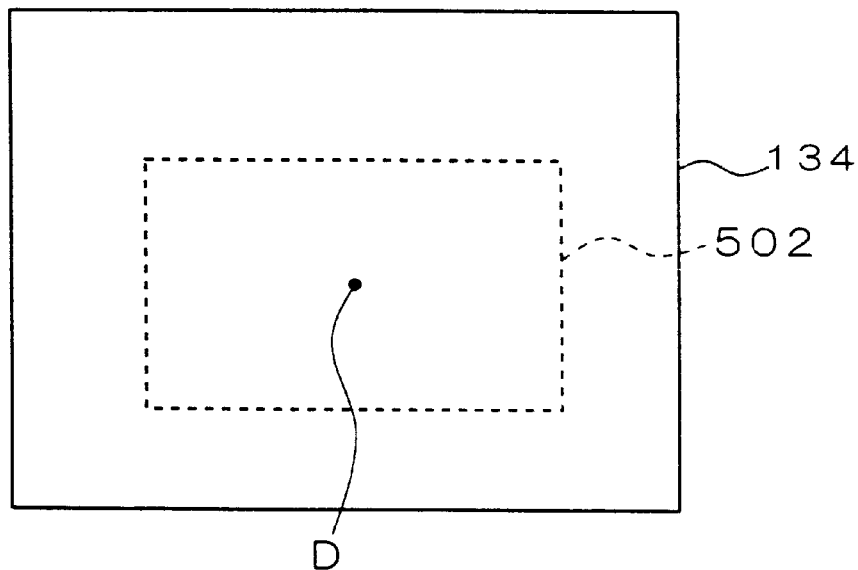
FIG. 19 is a view showing an example of a picture range.

In the above described embodiment, descriptions are made with respect to the game apparatus for the shooting game. Alternatively, the present invention may be applied to game apparatuses for other kinds of games. For example, in a game apparatus for photographing an object by a camera as an display object on a screen, a center position of a photographing range is detected as an arbitrary point instructed by the player based on a direction of a camera lens, and as shown in FIG. 19, a predetermined range including the arbitrary point D at its center is set as a photographing range 502.

Figure 20:
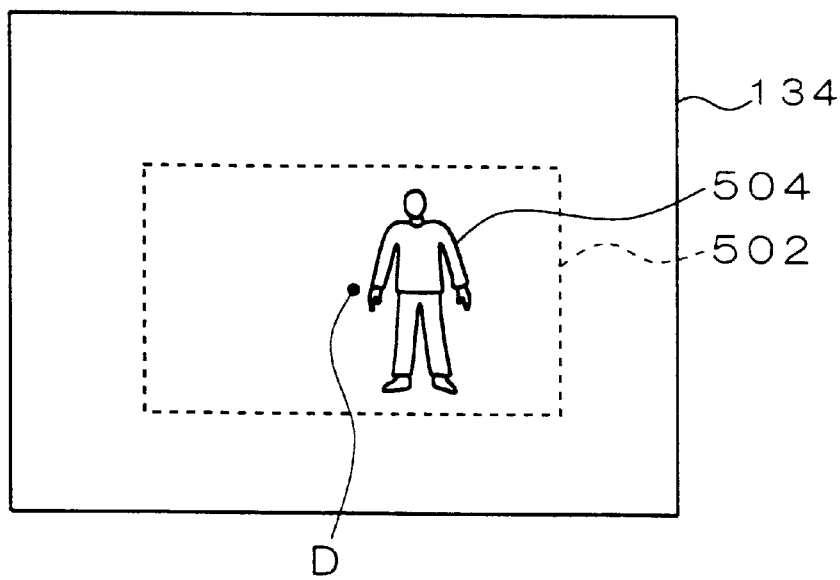
FIG. 20 is a view showing an example of an image including a prescribed object within the picture range.
Figure 21:
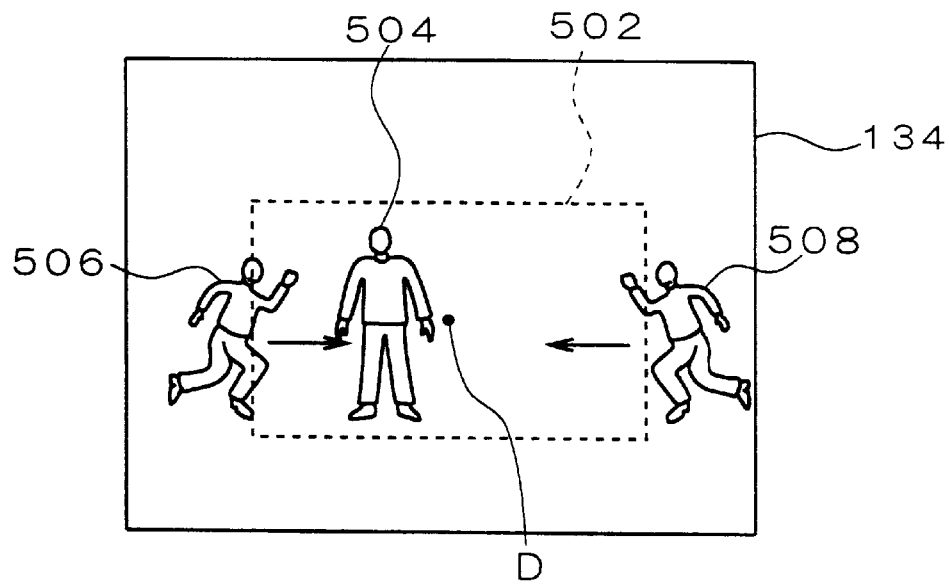
FIG. 21 is a view showing another example of an image including another object within the picture range.

In this game apparatus, it is assumed that a game rule is set in which a score is added when a specific object is photographed from among numbers of objects. In this case, when the specific object 504 is included in the photographing range 502 as shown in FIG. 20, characters corresponding to the other objects 506 or the like are made to perform prescribed movement such that the other objects 506, 508 move in the photographing range 502 as shown in FIG. 21. For this reason, it is not easy to photograph the prescribed object 504 only in the photographing range 502, thereby attaining a game of competing time or the like taken to photograph the object 504 only.

Figure 22:
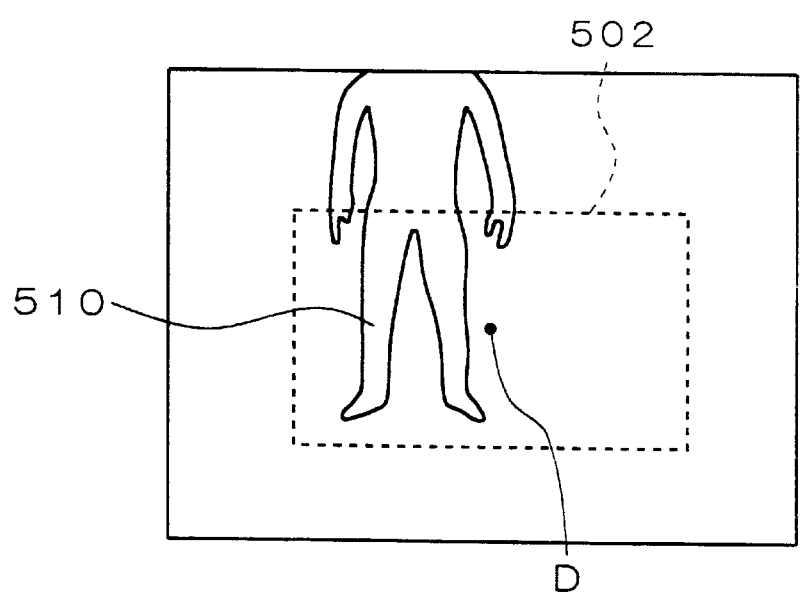
FIG. 22 is a view showing an example of an image including legs of the object within the picture range.
Figure 23:
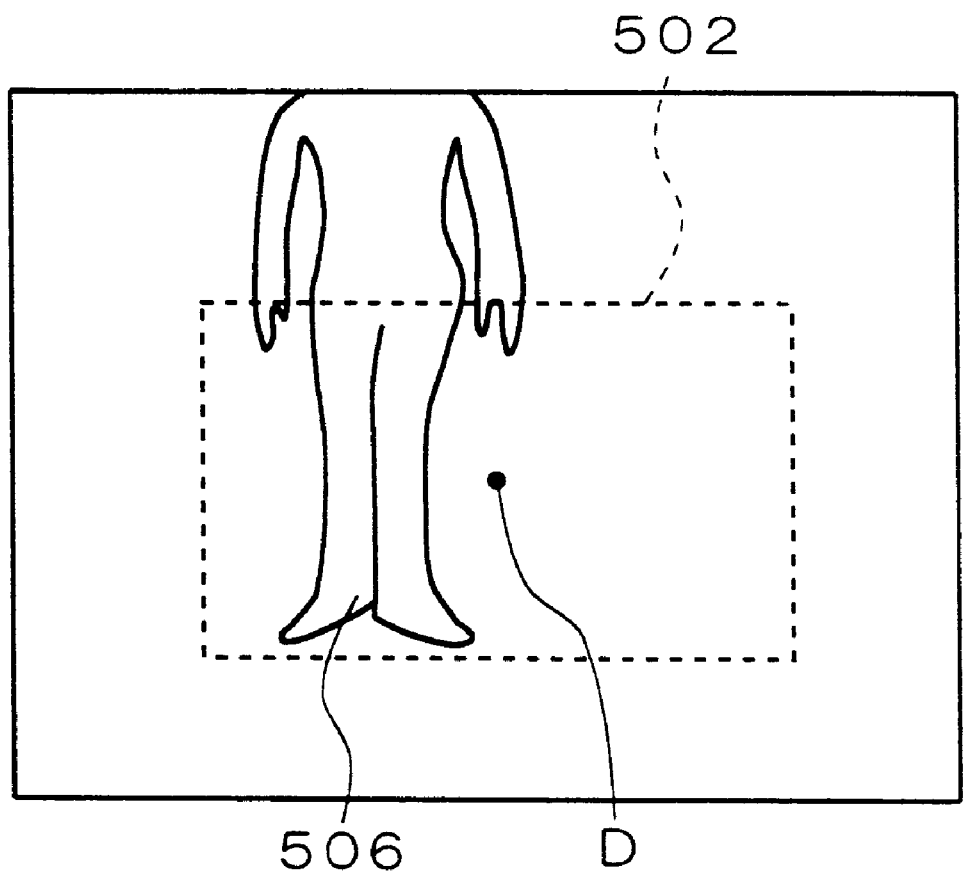
FIG. 23 is a view showing another example of an image including legs of the object within the picture range.

It is further assumed that, when prescribed part of an object (for example, legs) is included in a photographing range, an object makes a pose such that the part looks most beautiful. As shown in FIG. 22, when the legs 510 of the object are included in the photographing range 502, or an arbitrary point D corresponding to the center of the lens overlaps the legs 510 of the object, the object may be made to make the pose such that the legs 510 looks mots beautiful as shown in FIG. 23.

As described above, according to the present invention, when the character and its surroundings displayed on the screen are pointed by the player, the character may be made to perform the prescribed movement such as escaping. Accordingly, the avoiding movement or the like of the character aimed by the fighting opponent can be produced with reality, thereby permitting enhancing reality of the game.

What is claimed is:

1. A game apparatus comprising:

display unit for displaying a game image including a character on a screen;

position specifying unit for specifying an arbitrary position on said screen by a predetermined operation;

character movement setting unit for making said character to perform a prescribed movement when said arbitrary position specified by said position specifying unit approaches a display position of said character displayed on said screen;

arrival time prediction unit for predicting time which it takes said arbitrary position to arrive at a third area including the display position of said character, based on a moving speed and a moving direction of said arbitrary position specified by said position specifying unit, wherein said character movement setting unit makes said character to perform the prescribed movement when the time predicted by the arrival time prediction unit is within a predetermined time.

2. The game apparatus according to claim 1, wherein said position specifying unit includes a gun-type controller, and wherein an arbitrary position on said screen specified by said position specifying unit is an aiming position of said gun-type controller.

3. The game apparatus according to claim 2, wherein said gun type-controller comprises a light emitting section for emitting light toward said aiming position, said game apparatus comprising:

a screen made of translucent material arranged so as to cover said display unit;

a camera for photographing an irradiation position of the light emitted from said light emitting section on said screen;

aiming position calculating unit for calculating said aiming position based on said irradiation position on said screen photographed by said camera.

4. The game apparatus according to claim 3, wherein said light emitting section emits light with infrared wavelengths.

5. The game apparatus according to claim 1, wherein said position specifying unit comprises a dedicated controller including a movement operating section provided with a cross cursor key or a joystick, and wherein an arbitrary position on said screen specified by said position specifying unit is a display position of an indication moving on said screen according to operation of said movement operating section.

6. The game apparatus according to claim 1, wherein said character movement setting unit makes said character to perform the prescribed movement when the display position of said character is included in a first area including said arbitrary position specified by said position specifying unit.

7. The game apparatus according to claim 1, wherein said character movement setting unit makes said character to perform the prescribed movement when said arbitrary position specified by said position specifying unit is included in a second area including the display position of said character.

8. The game apparatus according to claim 1, wherein said character movement setting unit variably set said prescribed movement to be performed afterwards depending upon the movement of said character performed before said prescribed movement.

9. The game apparatus according to claim 1, further comprising distance calculating unit for calculating a distance between said arbitrary position specified by said position specifying unit and the display position of said character, wherein said character movement setting unit variably set said prescribed movement of said character depending upon the distance calculated by said distance calculating unit.

10. The game apparatus according to claim 1, further comprising speed calculating unit for calculating moving speed of said arbitrary position specified by said position specifying unit, wherein said character movement setting unit variably set said prescribed movement of said character depending upon the moving speed calculated by said speed calculating unit.

* * * * *